United States Patent Office 3,498,655
Patented Mar. 3, 1970

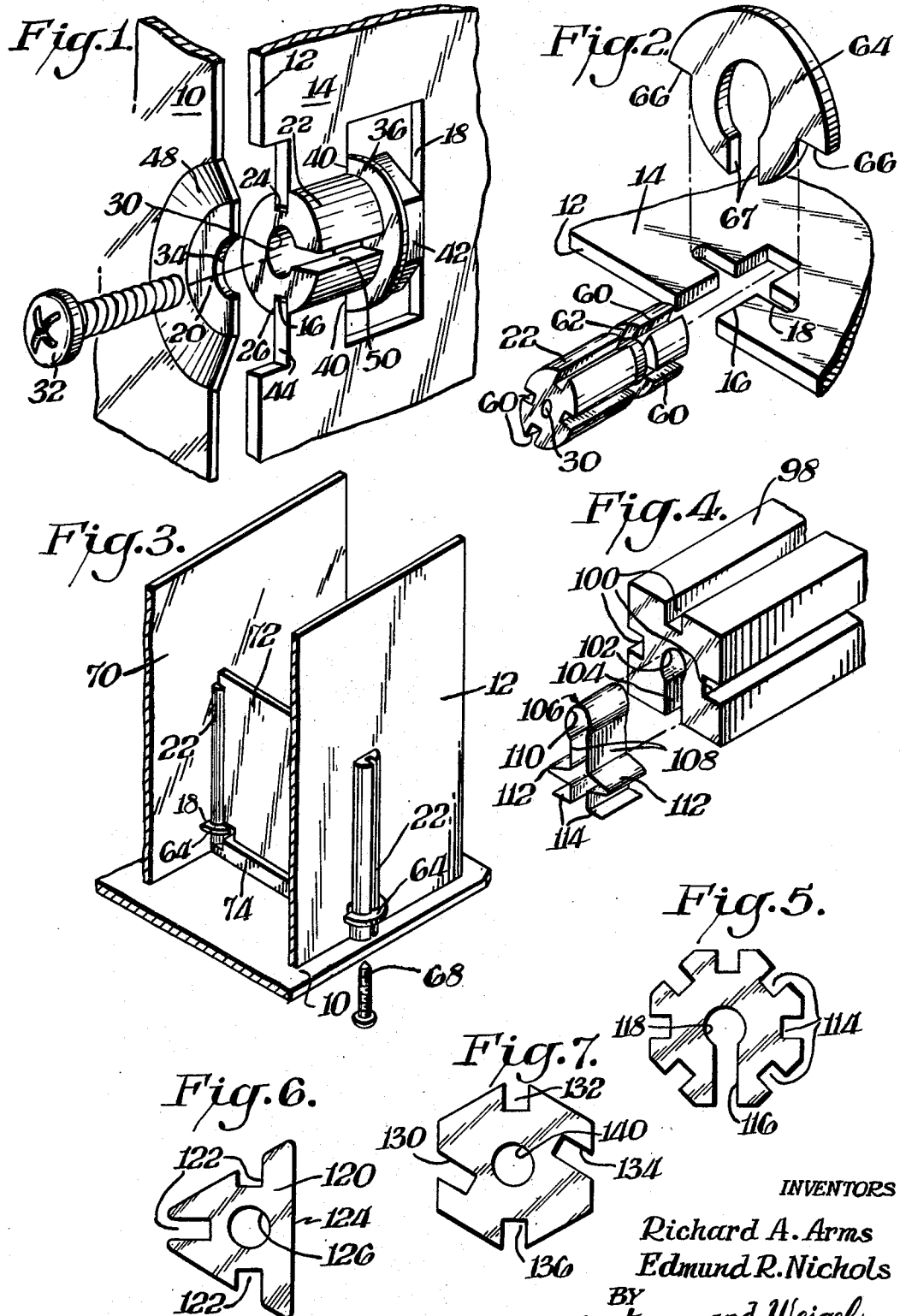

3,498,655
PANEL MOUNT AND FASTENER
Richard A. Arms, Sunnyvale, Calif., and Edmund R. Nichols, Wilmington, Del., assignors to Hewlett-Packard Company, Palo Alto, Calif., a corporation of California
Filed Sept. 18, 1968, Ser. No. 760,657
Int. Cl. F16b 5/02
U.S. Cl. 287—189.35  8 Claims

ABSTRACT OF THE DISCLOSURE

Panels are fastened together using a rod fastener that is longitudinally grooved and has an axial bore. The fastener slips into a slot in one of the panels such that grooves on the fastener engage the opposing edges of the slot. A washer, which also engages the fastener, is slid into a second slot in the panel intersecting the first slot. In this manner the fastener is locked within the one panel. A second panel is secured to the first by a screw inserted into the axial bore in the fastener. The remaining longitudinal grooves in the fastener may be used as tracks to mount the edges of component bearing panels such as printed circuit boards.

---

This invention relates to panel mounts and fasteners which are particularly useful in mounting the edge of one panel to a second panel.

BACKGROUND OF THE INVENTION

It has often been necessary or desirable to secure the edge of one planar panel to the face of a second panel. This need has arisen not only in the field of cabinetry for instruments, but also in the building industry wherein the modular construction of components in houses has encountered increasing demand. The need also exists in building larger enclosures not only for packing containers but also for rooms and other storage enclosures for use on shipboard and elsewhere.

The mounting and fastening of panels together is a particular requirement in the instrumentation industry. In the making of instrument cabinets, for example, it has been necessary in the past to fold the metal, to spot weld it, and to go through many other manufacturing procedures in order to provide a suitable appearance for the cabinet. When sheet metal folding is involved, considerable design time is expended to take into account the shrinkage due to the folds in the metal itself and thereby to achieve a finished product of the proper size and configuration.

Printed circuit boards have presented a particular problem. It is the usual practice to mount printed circuit or other component bearing boards into parallel opposing sliders or slots for support and thence into an edgeboard connector. These prior mounts for printed circuit boards have been satisfactory but unfortunately have required an excessive number of components which must be mounted by hand to the cabinetry after the cabinetry is completed. This is not only difficult in many cases but is time consuming.

It is, therefore, an object of this invention to obviate many of the disadvantages of the prior art panel mount and panel fastener arrangements.

Another object of this invention is to provide an improved panel mount which is simple, easy to assemble, and provides secure mountings.

BRIEF DESCRIPTION OF THE INVENTION

In a preferred embodiment of the invention, a securing or fastening rod, having at least a pair of longitudinal grooves disposed on opposite sides of the rod and lying in the same plane intersecting the axis of the rod, is inserted into a rectangular slot in the edge of one panel such that the grooves of the rod receive the opposing slot edges. A second rectangular slot intersecting the first slot is formed in the one panel such that a device may be secured to the rod to lock the rod within the first slot. The face of a second panel is secured to the edge of the first panel by a screw, or other fastening means, inserted into an axial bore in the rod which is now locked into the slot of the first panel.

A third longitudinal groove may be formed in the securing rod such that the rod may receive one edge of a printed circuit board. In this manner, the rod performs a dual function of mounting a printed circuit board as well as securing two panels together. The two panels may be, for example, the base and side of an instrument cabinet.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is an isometric representation, partially exploded, of one embodiment of the panel mount constructed in accordance with this invention;

FIGURE 2 is an isometric, fully exploded view of a preferred embodiment of the fastening device of this invention;

FIGURE 3 is an isometric, partly cutaway, view of an instrument cabinet mounting a printed circuit board using the panel fastener illustrated in FIG. 2;

FIGURE 4 is an isometric, partial representation of an alternative embodiment of the fastening rod of FIG. 1 constructed in accordance with another embodiment of this invention;

FIGURE 5 is a cross-sectional view of an alternative embodiment of the fastening rod illustrated in FIG. 4;

FIGURE 6 is a cross-sectional view of still another embodiment of the fastening rod illustrated in FIG. 4; and FIGURE 7 is a cross-sectional view of still another fastening rod which may be utilized in the embodiments illustrated in FIGS. 1 and 2.

DESCRIPTION OF THE PREFERRED EMBODIMENTS

The embodiment illustrated in FIG. 1 is that by which the face or edge of a first panel 10 may be joined or secured to the edge 12 of a second panel 14. To accomplish this, a rectangular slot 16 is formed in the edge of the second panel 14. A second rectangular slot 18 is also formed in the second panel 14 in such a manner that its longitudinal axis (the axis of the length dimension) intersects the longitudinal axis 20 (of the length dimension) of the first slot 16. A rod-like fastener or securing mechanism 22 is used. The fastener 22, in this instance, is illustrated as being in the shape of a hollow cylindrical rod having longitudinal grooves 24, 26 formed therein. The longitudinal grooves 24 and 26 lie in a plane that intersects the axis 20 and are adapted to receive the opposing edges of the slot 16. An axial bore 30 is formed along the axis of the fastener 22 and may be threaded to receive a screw or bolt 32 which passes through a hole formed in the edge of the first planar panel 10. The bolt 32 passes through the bore 30 and a flat washer 36 which is of sufficient diameter to overlap or engage the corners 40 formed by the intersection of the two slots 16 and 18. The bolt 32 is secured by a nut 42 which overlies and retains the washer 36 in position. Thus by tightening the bolt 32 and/ or the nut 42, the first panel 10 may be drawn up to and held very securely against the edge 12 of the second panel 14.

The edge 12 of the second panel 14 may be notched or recessed as illustrated at 44 to provide a more secure fastening element and permit the first panel 10 to be drawn into the notched region 44. To facilitate the first panels mating with the notched region 44, a concave portion 48 may be formed in the edge of the first panel 10 to engage the notched portion 44. Finally, the fastener 22 may have a longitudinal slot 50, preferably intersecting the bore 30 formed therein to permit a third panel such as a component bearing board, i.e., a printed circuit board, to be inserted and secured. The third panel can be adequately secured against axial movement in the slot 50 between the face of the first panel and the washer 36, if desired. For this purpose, the fastener 22 may be formed in varying lengths to accommodate different size circuit boards.

Another embodiment of the invention is illustrated in FIG. 2 in which the fastener 22 may be modified to have no slot (such as the slot 50 in FIG. 1) intersecting the axis, but rather four equi-angularly spaced longitudinal grooves or channels 60. The fastener 22 in this embodiment has a central axial bore 30 and a radial groove 62 formed about the periphery of the rod. The bore 30 is threaded to engage the threads of a screw 68. In this case, the second or retainer slot 18 is formed in the second panel at a location along the longitudinal axis of first slot 16 in the second panel 14 to coincide with the axial distance of the radial groove 62 in the fastener 22. The fastener is inserted into the slot 16 such that either pair of the oppositely disposed grooves 60 engage the opposing edges of the slot 16. Then a C-washer 64 is inserted into the slot 18 to engage the radial groove 62 and thereby lock the fastener 22 axially within the slot 16. The C-washer may have end flanges 66 to limit the degree to which the C-washer 64 may engage the radial slot 62. Furthermore, the open portion 67 in the C-washer has an opening width slightly less than the diameter of the radial groove 62 such that the C-washer may be snapped into position over the fastener 22 and does not easily become dislodged.

The fasteners illustrated in FIG. 3 are the same as those illustrated in FIG. 2. In this illustration of FIG. 3 there is seen a portion of a cabinet formed wherein the bottom or base panel 10 is mounted to an upright panel 12 using a fastener like the fastener 22 but elongated. The C-washer 64 is inserted into the retainer slot or groove 18 and snapped into the radial groove of the fastener 22 such that the fastener is locked in position. A screw 68 is inserted through a hole (not shown) in the lower panel 10 and its threads engage the bore 30 to secure the bottom panel 10 to the side or upright panel 12. By extending the length of the slot 16 such that it extends well above the retaining groove 18, an excellent mount for printed circuit or other component bearing boards may be had. If a second wall 70 is also secured to the bottom panel 10 as by another fastener of the same type as 22, or a different type, a printed circuit board 72 may be readily mounted by either edge. If the same type of fastener 22 is used to mount or secure the second panel 70, the printed circuit board 72 may be slid into the oppositely disposed longitudinal grooves 60 of the two fasteners to engage a receptacle or edgeboard connector 74 secured to the bottom panel 10 by conventional means.

The embodiment of FIG. 4 shows an alternative embodiment of the fastening rod which may be used in lieu of the cylindrical rods previously illustrated. In the embodiment of FIG. 4 the fastening rod is illustrated as being square in cross-section and yet has any and all of the longitudinal grooves 100 as may be formed in the cylindrical rod. Preferably the grooves 100 are located in the middle of the respective sides of the rod, but according to need may be positioned off center if desired. The rod of FIG. 4 may have an axial bore 102 and a groove or slot 104 in one side which is of sufficient depth to intersect the bore 102. A U-shaped spring clip 106 having arms 108 may be inserted into the bore 102 and slot 104 such that its protruding arms 108 form opposing jaws which may be used to engage a printed circuit board or other component bearing board (not shown). The spring clip 106 is in the form of an elongated, U-shaped clip bent into the general U-shape with the bottom of the U being formed in the general shape of a barrel 110 to enhance its fit within the bore 102. Each of the arms 108 are formed to have longitudinal ridges 112 which add strength and rigidity to the spring clip 106 and facilitate its securely engaging the component bearing boards. The ends 114 of the arms 108 are bent outwardly to present a smooth, rounded opening for the spring clips. The spring clip 106 is inserted endwise into the bore 102 and slot 104 of the fastener 98 prior to the fastener's being inserted into its slot in a panel. The edge of the component bearing boards ar then slid into the clip 106. Either a C-washer as illustrated in FIG. 2 or a full washer as illustrated in FIG. 1 may be used with the rod illustrated in FIG. 4. In the event a C-washer is used, a peripheral groove is formed in the periphery of the rod 98.

The embodiments of FIGS. 5, 6 and 7 show in cross-section a few of the different configurations of fastening rods that may be employed. Thus in the embodiments of FIG. 5 a rod, octagonal in cross-section, has longitudinal grooves 114 in seven of its eight faces and a longitudinal slot 116 intersecting a central bore 118 in the remaining one of its peripheral faces. The use of the octagonal rods permits the mounting of component bearing boards at angles other than 90° with respect to the slot containing board. FIG. 6 illustrates a fastening rod which is triangular in cross-section and has three longitudinal grooves 122, one in each of two of the faces of the rod and the third at the apex of the triangle. The third face 124 of the fastening rod has no groove therein. A bore 126 is formed within the rod close to the third face 124. Alternatively, the bore 126 may be relocated and a groove formed in the third face 124.

FIG. 7 illustrates a hexagonal rod having four grooves 130, 132, 134 and 136. Two of these four grooves, namely, grooves 130 and 134 are seen to be formed at an angle such that they do not lie in a plane intersecting the axis of the rod. This permits the angular mounting of the printed circuit boards. The third and fourth slots 132 and 136 are formed at opposite apexes of the hexagonal cross-section and are adapted to engage the slot 16 (FIGS. 1 and 2). Whatever the fastener rod cross-section, and any desired cross-section may be employed, the rod may have any number of longitudinal grooves within practical limits. These grooves may be formed on a plane intersecting the rod axis or not as desired. The slots which intersect the rod bore may be used or not as desired. The rod as in the embodiment of FIG. 2 need not have any slots—only grooves.

It may be noted that in each case the fastening rod has the particular advantage of being a rod which is formed preferably by extrusion. The typical sheet metal parts forming the panels may be stamped or punched to form the slots therein which cooperate with the fastening rod to secure the panels together. The fastening rod of this invention eliminates the normal metal folding and spot welding techniques that are employed to form the typical instrument cabinets. Furthermore, the usage of screws to secure the parts together is reduced; each fastener rod requiring but a single screw.

The invention thus provides a relatively simple, economical, easy-to-use fastener which facilitates the fastening of panels together. The edge of one panel is secured to the face of a second panel. Furthermore, by performing several longitudinal grooves in the fasteners, the fasteners perform the dual function of fastening and also as a mount for component bearing boards.

It will be obvious that various modifications may be made in the apparatus and in the manner of operating it.

What is claimed is:
1. A structure for mounting a first panel to a second panel comprising:
   a panel securing rod having a pair of longitudinal grooves disposed in a plane,
   said second panel defining a first slot in one edge thereof adapted to receive said rod with the grooves of said rod receiving the opposing panel edges of said slot and a second slot intersecting said first slot,
   securing means including a washer engaging said second slot for preventing substantial axial movement of said rod, and
   fastening means cooperating with said rod for fastening said first panel against the edge of said second panel.
2. A structure according to claim 1 wherein said washer is a C-washer which engages said second slot.
3. A structure according to claim 2 wherein said securing rod has a peripheral groove therein adapted to receive said C-washer.
4. A structure according to claim 3 wherein said fastening means for fastening said panels together is a screw, and
   said rod defines an axial bore adapted to receive said screw.
5. A structure according to claim 1 which also includes a support rod having a pair of longitudinal grooves, both disposed in a plane intersecting the axis of said rod, an axial bore, and a third longitudinal groove extending to said axial bore, and
   one of said panels having an extended slot in one edge adapted to receive said support rod with the grooves of said rod receiving the opposing panel edges of said extended slot, whereby said third groove is adapted to support the edge of a component bearing panel.
6. A structure according to claim 5 which also includes a compression spring clip adapted to fit in said third groove and having two cooperating arms adapted to flex together in a plane perpendicular to said rod axis to grip said component bearing panel, said spring clip arms having an extended width dimension along said rod axis.
7. A structure according to claim 1 wherein said rod is polygonal in cross-section.
8. In a component board assembly including a base mounted edgeboard connector for securing one edge of a component board, a mount for removably mounting the two edges of the component board adacent to said one edge between a pair of panels, comprising:
   a pair of board securing rods each having a pair of longitudinal grooves disposed in respective different planes, and a third longitudinal groove,
   each of said panels defining a first slot in one edge thereof adapted to receive one of said rods with the grooves of each said rod receiving the corresponding panel edges of said slot,
   each of said panels also defining a second slot intersecting the corresponding one of said first slots,
   securing means including a washer engaging each of said second slots for preventing axial movement of said pair of rods, and
   said third groove of each of said pair of rods being adapted to receive one of said component board edges, thereby to mount said component board between said panels.

References Cited

UNITED STATES PATENTS

| | | |
|---|---|---|
| 2,916,114 | 12/1959 | Flora. |
| 3,110,338 | 11/1963 | Rapata _____ 151—41.75 |
| 3,399,914 | 9/1968 | Grant _____ 287—189.35 |
| 3,425,725 | 2/1969 | Givot et al. _____ 287—189.35 |

FOREIGN PATENTS

| | | |
|---|---|---|
| 216,293 | 7/1961 | Austria. |
| 1,396,724 | 3/1965 | France. |
| 1,488,278 | 6/1967 | France. |

MARION PARSONS, Jr., Primary Examiner

U.S. Cl. X.R.

85—8.9; 151—41.76; 287—189.36

UNITED STATES PATENT OFFICE
CERTIFICATE OF CORRECTION

Patent No. 3,498,655 March 3, 1970

Richard A. Arms et al.

It is certified that error appears in the above identified patent and that said Letters Patent are hereby corrected as shown below:

Column 5, lines 23 and 24, cancel "fastening".

Signed and sealed this 8th day of September 1970.

(SEAL)
Attest:

Edward M. Fletcher, Jr.
Attesting Officer

WILLIAM E. SCHUYLER, JR.
Commissioner of Patents